United States Patent
Pohl

(10) Patent No.: US 10,438,331 B2
(45) Date of Patent: Oct. 8, 2019

(54) DISTORTION MESHES AGAINST CHROMATIC ABERRATIONS

(71) Applicant: Intel Corporation, Santa Clara, CA (US)

(72) Inventor: Daniel Pohl, Saarbrucken (DE)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 14/316,322

(22) Filed: Jun. 26, 2014

(65) Prior Publication Data

US 2015/0379697 A1  Dec. 31, 2015

(51) Int. Cl.
- *G06T 5/00* (2006.01)
- *G06T 5/50* (2006.01)
- *G02B 27/01* (2006.01)

(52) U.S. Cl.
CPC .......... *G06T 5/006* (2013.01); *G02B 27/0172* (2013.01); *G06T 5/50* (2013.01); *G02B 2027/011* (2013.01); *G06T 2207/10016* (2013.01); *G06T 2207/10024* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 6,249,289 B1 * | 6/2001 | Arnaud | G06T 15/005 345/419 |
| 6,536,907 B1 * | 3/2003 | Towner | H04N 5/335 348/745 |
| 2007/0035706 A1 * | 2/2007 | Margulis | G03B 21/20 353/122 |

(Continued)

FOREIGN PATENT DOCUMENTS

| CN | 102326380 A | 1/2012 |
|---|---|---|
| EP | 1804103 A1 | 7/2007 |

(Continued)

OTHER PUBLICATIONS

International Search Report for PCT Application No. PCT/US2015/035021, dated Aug. 28, 2015, 3 pages.

(Continued)

*Primary Examiner* — Aaron M Richer
(74) *Attorney, Agent, or Firm* — Jaffery Watson Mendonsa & Hamilton LLP

(57) ABSTRACT

Systems and methods may provide a plurality of distortion meshes that compensate for radial and chromatic aberrations created by optical lenses. The plurality of distortion meshes may include different lens specific parameters that allow the distortion meshes to compensate for chromatic aberrations created within received images. The plurality of distortion meshes may correspond to a red color channel, green color channel, or blue color channel to compensate for the chromatic aberrations. The distortion meshes may also include shaped distortions and grids to compensate for radial dis- (Continued)

tortions, such as pin cushion distortions. In one example, the system uses a barrel-shaped distortion and a triangulation grid to compensate for the distortions created when the received image is displayed on a lens.

22 Claims, 5 Drawing Sheets

(56) References Cited

U.S. PATENT DOCUMENTS

| | | | |
|---|---|---|---|
| 2010/0090929 A1 | 4/2010 | Tsujimoto | |
| 2012/0081800 A1* | 4/2012 | Cheng | G03B 21/00 359/720 |
| 2013/0124159 A1* | 5/2013 | Chen | G06T 5/006 703/2 |
| 2014/0009368 A1 | 1/2014 | Hirota | |
| 2014/0161357 A1* | 6/2014 | Tsubaki | G06T 5/006 382/197 |

FOREIGN PATENT DOCUMENTS

| | | |
|---|---|---|
| EP | 2688060 A1 | 1/2014 |
| JP | H10327373 | 12/1998 |
| JP | 2008-258802 A | 10/2008 |
| JP | 2008258802 A | 10/2008 |
| JP | 2010096864 | 10/2008 |
| JP | 2011139158 | 12/2009 |
| JP | 2011217057 | 3/2010 |
| JP | 2017524278 | 8/2017 |
| KR | 10-2004-0093206 A | 11/2004 |
| KR | 1020040093206 | 11/2004 |
| WO | 20100071647 A1 | 6/2010 |

OTHER PUBLICATIONS

Written Opinion for PCT Application No. PCT/US2015/035021 dated Aug. 28, 2015, 7 pages.
Nasim Mansurov, "What is Chromatic Aberration", Nov. 8, 2011, 11 pages.
Pohl, et al., "Improved Pre-Warping for Wide Angle, Head Mounted Displays", Oct. 6, 2013, 4 pages.
Oculus VR, SDK Overview, SDK Version 0.3.2 Preview, May 21, 2014, 59 pages.
Notice of Allowance for Korean Application No. 2016-7032401, dated May 2, 2018, 6 pages, dated Jan. 29, 2018.
Notification of Reasons for Refusal for Application No. JP2016567750, 6 pages.
Extended European Search Report for EP Application No. 15812036. 0, 8 pages, dated Oct. 17, 2017.
Daniel Pohl et al., "Improved pre-warping for wide angle, head mounted displays", (ISBN: 978-1-4503-2379-6), The 19th ACM Symposium on Virtual Reality Software and Technology, VRST '13; Jan. 1, 2013, p. 259.
Office Action from CN Application No. 201580027655.0, dated Dec. 10, 2018, 20 pages.
Notice of Allowance for JP Application No. 2016-567750, 6 pages, dated Sep. 10, 2018.
International Preliminary Report on Patentability for PCT Application No. PCT/US2015/035021, 8 pages, dated Dec. 27, 2016.

* cited by examiner

DISTORTION MESHES AGAINST CHROMATIC ABERRATIONS

BACKGROUND

Head mounted displays (HMDs) may be used to provide users or viewers with additional information by means of a display mounted in front of the eyes of the viewer. HMDs may often be used to provide users with an immersive experience, e.g., in three-dimensional (3D) gaming, augmented reality applications, and the like, by filling the field of view of the viewer. To achieve immersion at relatively low costs, a display panel may be placed a short distance in front of each eye.

Wide angle optics (lenses) may be used to focus on the display and enable a wide field of view. Cheaper, lighter and lower quality lenses may introduce spatial and chromatic distortions of the image such as radial distortions and chromatic aberrations. The radial distortions created by these lenses typically include pin-cushion distortions. As a result, the images to be displayed may be pre-warped to cancel the distortions. Pre-warping may typically be performed in a post-processing step using a pixel shader. However, the discrete resampling utilized by pixel shaders may lead to a loss in image quality. Further, some graphics architectures may not support the use of pixel shaders.

BRIEF DESCRIPTION OF THE DRAWINGS

The various novel aspects of the embodiments of the present disclosure will become evident to a person of ordinary skill in the art given the following enabling specification and appended claims, and by referencing the following drawings, in which:

DETAILED DESCRIPTION OF THE DRAWINGS

Figure 1:
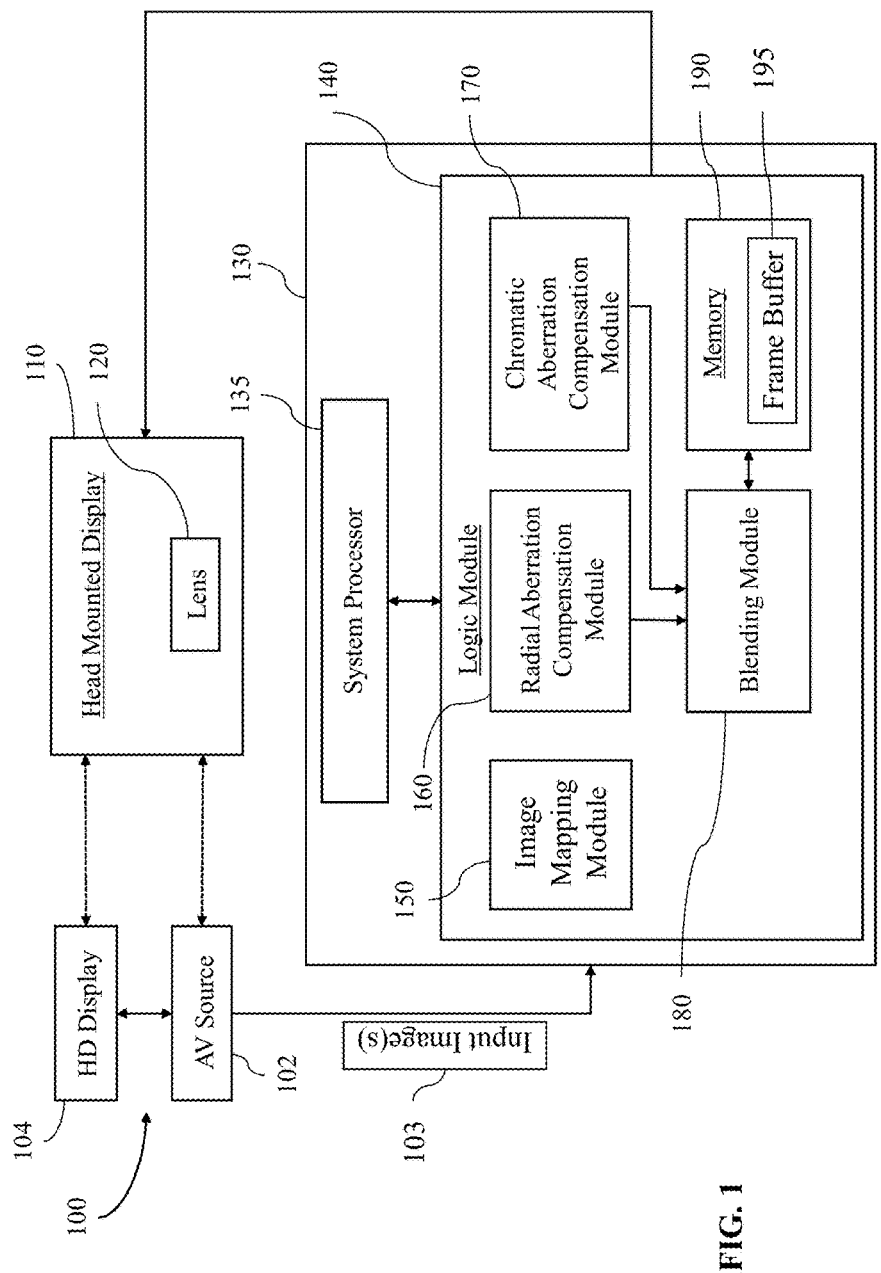
FIG. 1 is a block diagram of an example of a distortion compensation system according to an embodiment.

FIG. 1A shows a block diagram of an example of a system 100 in accordance with an embodiment of the present disclosure. The system 100 may include a wearable display such as, for example, a head mounted display (HMD) 110, having one or more optical lens(es) 120 for viewing and/or capturing images. The HMD 110 may be worn by a user to provide an immersive viewing experience that may be particularly suited for three-dimensional (3D), gaming (e.g., video, alternative reality, and augmented reality), and other similar applications. While a standard HMD 110 is shown, it should be noted that this illustration is for discussion purposes only. Other displays may be used without departing from the disclosure including, for example, action sports eyewear (e.g., goggles or glasses), video recording glasses and eyewear, head mounted cameras, and the like. The lens 120 may be a wide angle lens that is particularly suited for 3D, gaming, and similar applications. The lens 120, however, depending on the optical quality may introduce distortions including radial and chromatic distortions within the images viewed via the lens 120.

In at least some embodiments, the system 100 may also optionally include a HD audio-video (AV) source 102 (e.g., a Blu-ray disc, digital versatile disc/DVD, or streaming video device), and a High Definition (HD) display 104 (e.g., an HDMI compatible television/TV, HDTV or Smart TV). The AV source 102 may enable images to be reproduced and viewed via the HMD 110. In some embodiments, the AV source 102 enables images to be displayed on the HD display 104 via, for example, an HDMI input such that the images can be viewed via the HMD 110. In some embodiments, the AV source 102 and/or HD display 104 may be in direct communication with HMD 110.

The illustrated system 100 includes a distortion compensation system 130 in communication with lens 120. In some embodiments, the distortion compensation system 130 receives an input image 103 from an input source such as, for example, the AV source 102 and/or lens 120. The illustrated distortion compensation system 130 includes a system processor 135 and logic module 140 to perform processes to reduce distortions within the received input images. In some embodiments, the distortion compensation system 130 may be completely or partially incorporated within the HMD 110. In at least some embodiments, the logic module 140 includes an image mapping module 150, radial aberration compensation (RAC) module 160, chromatic aberration compensation (CAC) module 170, blending module 180, and memory 190 having a frame buffer 195.

In at least one embodiment, the distortion compensation system 130 receives input images captured from an image source such as, for example, the AV source 102, and causes the logic module 140 to perform processes to map a received image onto one or more of a plurality of distortion meshes, to compensate for (e.g., correct), radial distortions and chromatic aberrations within the received images, to blend the corrected images, and output a blended/corrected image to the HMD 110 such that a corrected image having reduced distortions can be viewed by a user. The logic module 140 may include image mapping technology, radial and chromatic distortion technology, and image blending technology, which may be implemented via, for example, a set of logic instructions, configurable logic or fixed functionality hardware logic, suitable to perform the radial and chromatic distortion compensation discussed herein.

In at least one embodiment, the image mapping module 150 receives one or more input images and maps the received images onto one or more of a plurality of distortion meshes. The RAC module 160 of system 100 may correct or compensate for radial aberrations within the received images. The RAC module 160 may utilize, for example, bi-cubic texture interpolation, to generate a better approximation towards the original image signal in order to maintain sharpness of the received image. The bi-cubic interpolation may include a barrel-shaped distortion designed to cancel or correct the radial distortions and output the radially corrected images. The illustrated CAC module 170 corrects or compensates for chromatic aberrations within the received images. For example, the CAC module 170 may independently correct for chromatic aberrations for each of the different color channels (e.g., red color channel, green color channel, and blue color channel). The CAC module 170 may also minimize chromatic aberration by considering three color channels (i.e., red, green, blue) instead of the entire visible light spectrum. The CAC module 170 may apply lens specific parameters depending on the color channel to control the degree of the chromatic aberration. The CAC module 170, in performing this correction, may separately render individual corrected images (e.g., chromatically corrected images), for each color channel. The blending module 180 may then blend the resulting individual corrected images to yield a blended corrected (i.e., composite) image. The blended corrected image may be output to the HMD 110 such that the blended corrected image contains reduced radial distortions and chromatic aberrations when viewed via lens 120. The outputs of the RAC module 160, CAC module 170, and blending module 180 may be stored in memory 190. The memory 190 may include video compatible storage such as the frame buffer 195 to store the individually rendered corrected images and blended corrected images.

Chromatic aberration, sometimes referred to as "fringing", "color fringing", "purple fringing", etc., may be a problem common to optical lenses, particularly low-quality and wide angled lenses. Chromatic aberration typically occurs when a lens is unable to focus all wavelengths of color at the same focal plane and/or when wavelengths of color are focused at different points in the focal plane. Chromatic aberration tends to be caused by dispersion within the lens, where the various colors of light travel at different speeds while passing through the lens. This effect causes the image to look blurred or include colored edges (e.g., red, green, blue, yellow, purple, magenta) around objects, particularly in high-contrast situations. A "perfect" lens may focus all wavelengths of light into a single focal point, having the best focus with the "circle of least confusion".

Figure 2B:
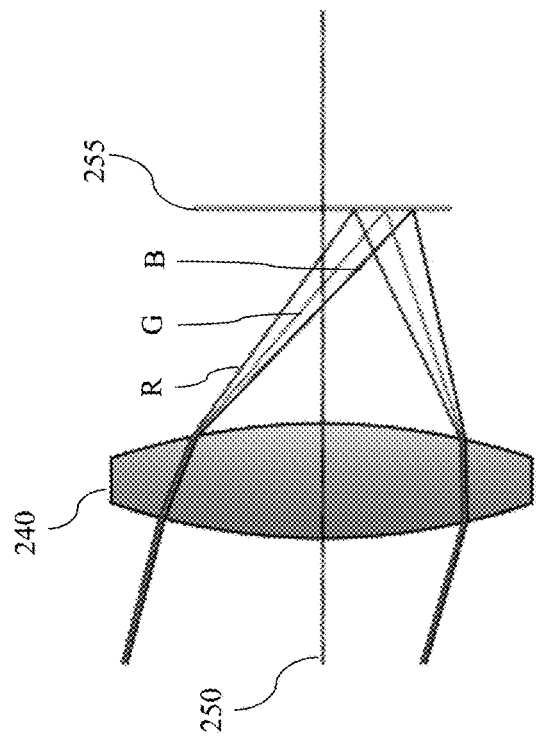
FIGS. 2A-2B are illustrations of examples of lenses and the associated chromatic aberration according to an embodiment.
Figure 2A:
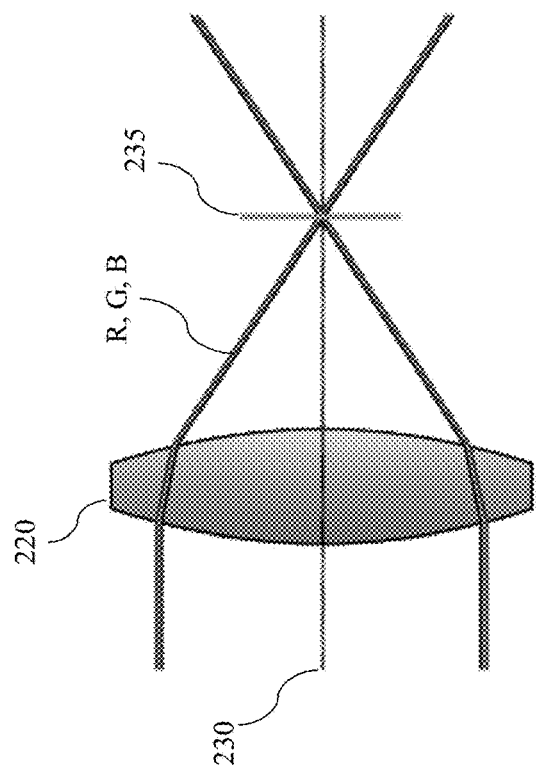

FIGS. 2A-2B illustrate examples of lenses and the associated chromatic aberration according to an embodiment of the present disclosure. FIG. 2A illustrates a "perfect" lens 220 having no chromatic aberration, wherein the lens 220 has an optical axis 230 and a best focus plane 235. The illustrated lens 220 is of high quality and produces no chromatic aberration, distortion or dispersion of light passing through the lens. Therefore, the lens 220 allows the different rays of light R, G, B passing through the lens to be focused on the same focus point 235. FIG. 2B illustrates, on the other hand, a typical, lower-quality lens 240 that produces a lateral chromatic aberration. Lateral chromatic aberration, sometimes referred to as "transverse" chromatic aberration, occurs when different wavelengths (i.e., colors) of light R, G, B pass at an angle through the lens 240 with respect to an optical axis 250 and focus at different points along the same focal plane 255. Lateral chromatic aberration does not appear in the center of the image and tends to only be visible towards the edges or corners of the image in high contrast areas. Blue and purple fringing commonly appears in some fisheye, wide-angle and low-quality lenses.

Figure 3C:
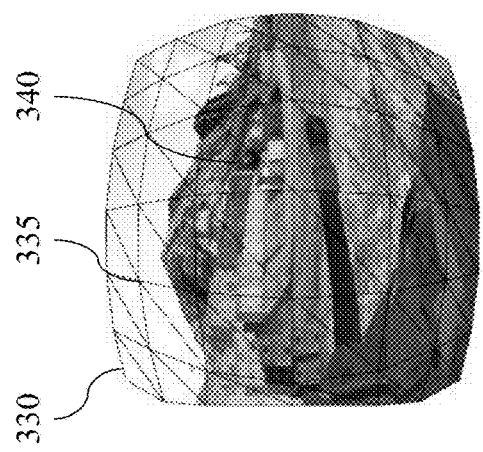
FIGS. 3A-3C are illustrations of examples of distortion meshes at various phases according to an embodiment.
Figure 3B:
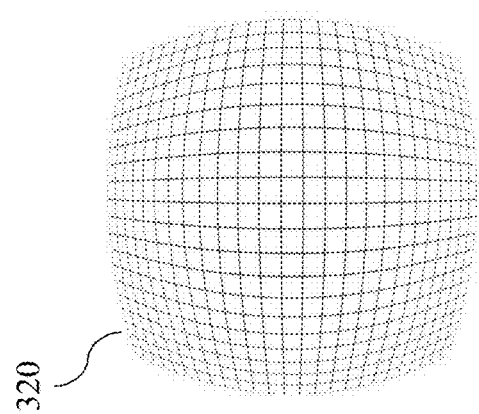
Figure 3A:
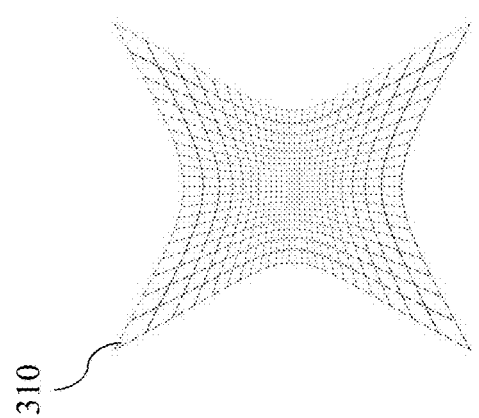

FIGS. 3A-3C illustrate examples of distortion meshes at various phases of an embodiment of the present disclosure. FIG. 3A illustrates a pincushion effect or pincushion distortion 310 created by spatial (i.e., radial) distortions within a lens. Spatial distortions in optical systems may result from both the shape and material quality of the lens. Pincushion distortions may be canceled or corrected by pre-warping the image presented on the display panel with a corresponding barrel-shaped distortion. FIG. 3B illustrates a barrel-shaped distortion 320 that may be applied to cancel or correct the pincushion distortion 310 (FIG. 3A). FIG. 3C illustrates a barrel-shaped distortion 330 including a triangulation grid 335 applied to an image 340. Triangulation grid 335 includes a grid or network of triangles that allow for more accurate correction of distortions within an image such as image 340. The barrel-shaped distortion 330 and triangulation grid 335 may approximate certain behavior and can be applied to an image by resampling the image or by mapping the image onto a distortion mesh in which the vertices have been displaced.

Figure 4:
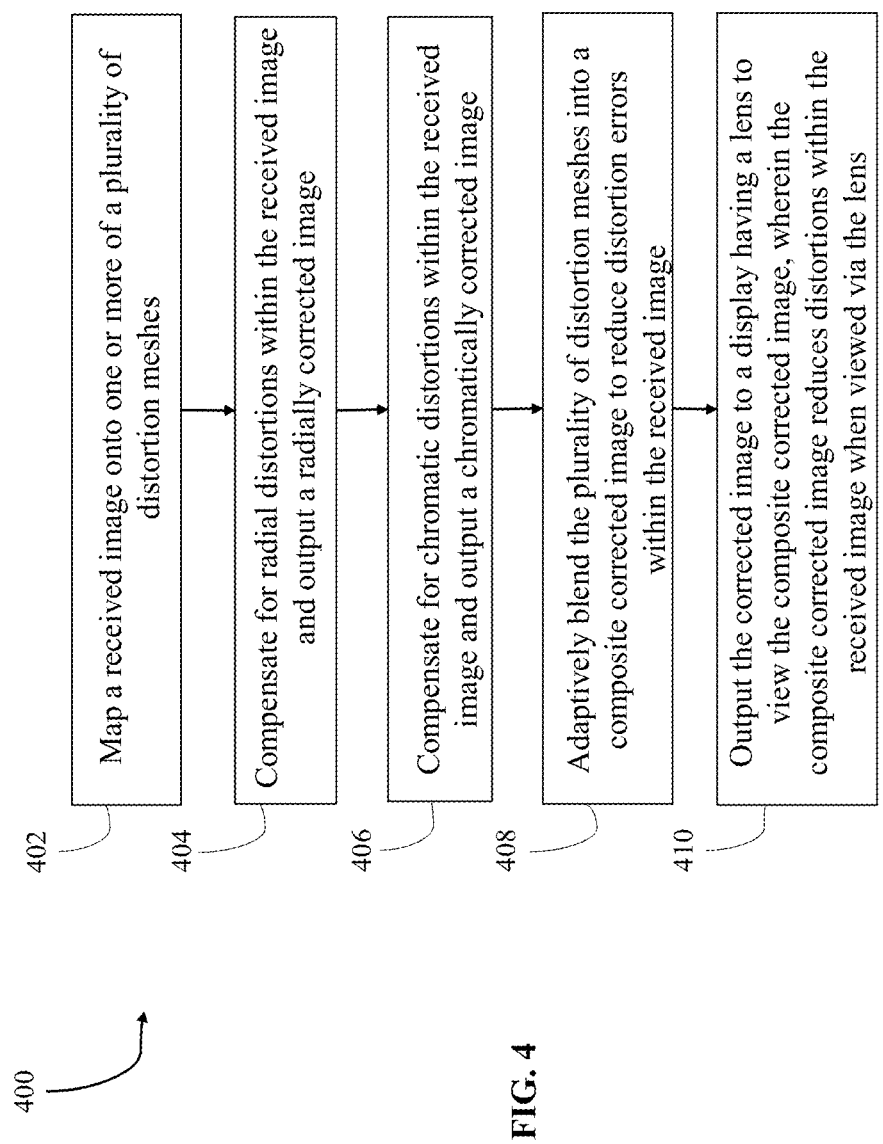
FIG. 4 is a flowchart of an example of a method of distortion compensation according to an embodiment.

FIG. 4 is a flowchart of an example of a method of distortion compensation according to an embodiment. The method 400 may be implemented in executable software as a set of logic instructions stored in a machine- or computer-readable storage medium of a memory such as random access memory (RAM), read-only memory (ROM), programmable ROM (PROM), firmware, flash memory, etc., in configurable logic such as, for example programmable logic arrays (PLAs), field programmable gate arrays (FPGAs), complex programmable logic devices (CPLDs), in fixed functionality logic hardware using circuit technology such as, for example, application-specific integrated circuits (ASIC), complementary metal oxide semiconductor (CMOS) or transistor-transistor logic (TTL) technology, or any combination thereof. For example, computer program code to carry out operations shown in method 400 may be written in any combination of one or more programming languages including an object-oriented programming language such as Java, Smalltack, C++ or the like, and conventional procedural programming languages, such as the "C" programming language or similar programming languages.

Illustrated processing block 402 provides for mapping a received image onto one or more of a plurality of distortion meshes. The distortion meshes may be generated to compensate for radial and chromatic distortions within the received image. Illustrated processing block 404 provides for compensating for radial distortions within the received image and outputting a radially corrected image. Illustrated block 406 provides for compensating for chromatic distortions within the received image and outputting a chromatically corrected image. The distortion meshes may also apply lens specific parameters in order to control the degree of the distortion. The distortion meshes may be individually generated for each color channel (i.e., red, green, blue) and the image may be independently corrected for each color channel. Illustrated processing block 408 provides for adaptively blending the plurality of independent distortion meshes into a composite corrected image to reduce distortion errors within the received image. Adaptive blending may refer to the process of adding the individual distortion meshes together to produce a composite corrected image. The composite corrected image may be created by adaptively blending, for example, by layering and combining, the corrected images of the individual distortion meshes to yield a single image. Illustrated processing block 410 provides for optionally outputting the composite corrected image to a display having a lens to view the corrected image such that the corrected image (at post processing) has reduced distortions (compared to pre-processing) when viewed via the lens.

Spatial distortions in optical systems may result from the shape, quality and material of the lens. This distortion (and its correction) may be described with respect to a Taylor series, as shown below with respect to Equation 1 below. A relatively small number of terms are sufficient to capture a barrel-shaped distortion such as shown in FIGS. 2B and 2C. In at least one embodiment, barrel-shaped distortions (including displacement from the optical axis) appropriate and suitable for correcting or compensating for radial distortions, such as pincushion distortions, in accordance with the present disclosure may be calculated by Equation 1, as follows:

$$r_{new} = r(k_0 + k_1 r^2 + k_2 r^4 + k_3 r^6) \quad (1)$$

where, $r_{new}$=the new distance from the lens distortion center (optical axis), r=the distance from lens distortion center (optical axis), and k=lens specific parameters controlling the degree of radial distortion.

The lens specific parameters relate to the shape, optical quality and materials of the lens and are typically available from the lens manufacturers.

Color fringing artifacts occur when light of different wavelengths refracts differently through a lens. This chromatic aberration can be corrected by separately resampling or mapping the red, green, and blue color channels of an image. In at least one embodiment, resampling and/or mapping appropriate and suitable for correcting or compensating for chromatic aberrations in accordance with the present disclosure may be calculated by Equation 2, as follows:

$$r^{RGB}_{new} = [r^R_{new}(c_0 + c_1 r^2), r^G_{new}, r^B_{new}(c_2 + c_3 r^2)] \quad (2)$$

where, $r^{RGB}_{new}$=the new distance from the lens distortion center (optical axis), r=the distance from lens distortion center (optical axis) for each color channel, and c=lens specific parameters controlling the degree of the chromatic aberration.

The lens specific parameters relate to the shape, optical quality and materials of the lens and are typically available from the lens manufacturers. $r^G_{new}$ provides a base or default measurement because, as shown in FIG. 2B, the green light rays are between the red and blue regarding color fringing through chromatic aberrations. The red color, $r^R_{new}$, and blue color, $r^B_{new}$, may be scaled with the lens specific parameters and the squared radius based on the green color, $r^G_{new}$, to provide the new distance from the lens distortion center, $r^{RGB}_{new}$.

In at least one embodiment, spatial and chromatic distortion correction may be performed in image space or object space based on Equations 1 and 2 in accordance with the present disclosure. The individually rendered images may be adaptively blended in accordance with the present disclosure by Equation 3, as follows:

$$C_0 = 1 * C_s + 1 * C_d \quad (3)$$

where, $C_0$=the output color,
$C_s$=the source color, and
$C_d$=the destination color.

When performing the blending process, the blending module 180 of system 100 (FIG. 1) may allow for the individually rendered corrected images to be left in the frame buffer 195 of memory 190 (FIG. 1). Thus, the new individually rendered corrected images may be added on top of the corrected images stored in the frame buffer 195 (FIG. 1). Assuming a 3×8-bit layout of the frame buffer indicates that the color values may be between 0 and 255 for each channel.

An example of a representation of a single pixel during rendering for adaptive blending in accordance with the present disclosure is provided, as follows:

1. At the start of rendering the distortion meshes, the pixel is black having the values (0, 0, 0) for red, green, blue.

2. The red distortion mesh may then be rendered. Assuming that the red value at the pixel is, for example, 50, the frame buffer pixel values would be (50, 0, 0).

3. The green distortion mesh may then be rendered. Assuming that the green value at the pixel is, for example, 100, the red pixel value of (50, 0, 0) would be added to the new green value of (0, 100, 0) to yield new frame buffer pixel values of (50, 100, 0).

4. The blue distortion mesh may then be rendered. Assuming that the blue value at the pixel is, for example, 255, the previous pixel value of (50, 100, 0) is added to the blue pixel value of (0, 0, 255) to yield new frame buffer pixel values of (50, 100, 255).

5. The final color for the pixel values would be (50, 100, 255). The final color would be output for display.

In at least one embodiment, the adaptive blending process, discussed above, allows the system to map a received image onto one or more of a plurality of distortion meshes, and use the one or more of the plurality of distortion meshes to compensate for radial and chromatic distortions within the received image. The distortion meshes may then be adaptively blended to add the individually rendered distortion meshes into a composite corrected image having reduced distortion errors (both radial and chromatic). The composite corrected image may be output to a display having a wide-angle or fisheye lens to view the composite corrected image such that the composite corrected image is substantially free of radial distortions and chromatic aberrations when viewed via the lens.

Figure 5:
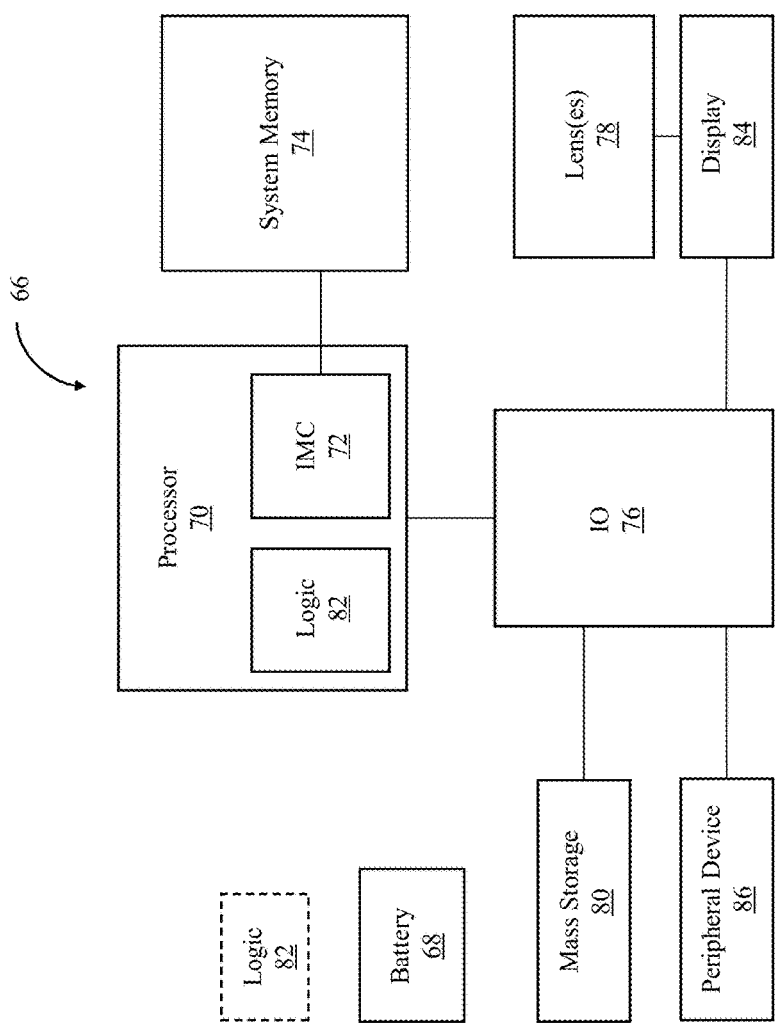
FIG. 5 is a block diagram of an example of a system according to an embodiment.

FIG. 5 shows a system 66. The system 66 may be part of a platform having computing functionality (e.g., video game console, desktop computer, laptop, tablet computer, convertible tablet, personal digital assistant/PDA), communications functionality (e.g., wireless smart phone), imaging functionality, media playing functionality (e.g., smart television/TV), wearable functionality (e.g., clothing, eyewear, headwear, jewelry) or any combination thereof (e.g., mobile Internet device/MID). In the illustrated example, the system 66 includes a battery 68 to supply power to the system 66 and a processor 70 having an integrated memory controller (IMC) 72, which may communicate with system memory 74. The system memory 74 may include, for example, dynamic random access memory (DRAM) configured as one or more memory modules such as, for example, dual inline memory modules (DIMMs), small outline DIMMs (SODIMMs), etc.

The illustrated system 66 also includes a input output (JO) module 76, sometimes referred to as a Southbridge of a chipset, that functions as a host device and may communicate with, for example, a display 84 (e.g., HD display, organic light emitting diode/OLED display, liquid crystal display/LCD, etc.), a peripheral device 86 (e.g., an AV player, Blu-ray player, DVD player, camera), one or more lenses 78 (e.g., optical lenses) of a head mounted display (HMD), and mass storage 80 (e.g., hard disk drive/HDD, optical disk, flash memory, etc.). The processor 70 may execute one or more distortion correction processes (not shown).

The illustrated processor 70 may also execute logic 82 that is configured to receive one or more images from the peripheral device 86, map the received images onto one or more of a plurality of distortion meshes, use the distortion meshes to compensate for chromatic aberrations and radial distortions within the images, adaptively blend the distortion meshes into a corrected image to reduce distortions within the image, and output the corrected image to the display 84 and/or lens 78. The corrected image reduces distortions within the image when viewed through the lens 78. Thus, the illustrated logic 82 may function similarly to the logic module (FIG. 1), already discussed.

Additional Notes and Examples

Example 1 may include a distortion reducing system for reducing distortions in an image viewed via a lens. The system may include a display, an image mapping module, a radial distortion compensation module, a chromatic aberration compensation module, and a blending module. The image mapping module may be in communication with an image source to map a received image onto one or more of a plurality of distortion meshes. The radial aberration compensation module may be in communication with the image mapping module to compensate for radial distortions within the received image and to output a radially corrected image. The chromatic aberration compensation module may be in communication with the image mapping module to compensate for chromatic distortions within the received image and to output a chromatically corrected image. The blending module may be in communication with the radial aberration compensation module and the chromatic aberration compensation module to adaptively blend the radially corrected image and the chromatically corrected image into a composite corrected image to reduce distortions within the received image, and to output the composite corrected image to be viewed via the display.

Example 2 may include the system of example 1, wherein the composite corrected image includes reduced distortions.

Example 3 may include the system of any one of examples 1 or 2, wherein each of the plurality of distortion meshes are distorted in a barrel shape.

Example 4 may include the system of example 3, wherein each of the plurality of distortion meshes include a triangulation grid.

Example 5 may include the system of example 1, wherein each of the plurality of distortion meshes corresponds to a red color channel, a green color channel, or a blue color channel.

Example 6 may include the system of example 5, wherein each of the color channels includes lens specific parameters to compensate for chromatic aberrations.

Example 7 may include a distortion reducing apparatus for reducing distortions in an image viewed via a lens. The apparatus may include an image mapping module, a radial distortion compensation module, a chromatic aberration compensation module, and a blending module. The image mapping module may be in communication with an image source to map a received image onto one or more of a plurality of distortion meshes. The radial aberration compensation module may be in communication with the image mapping module to compensate for radial distortions within the received image and to output a radially corrected image. The chromatic aberration compensation module may be in communication with the image mapping module to compensate for chromatic distortions within the received image and to output a chromatically corrected image. The blending module may be in communication with the radial aberration compensation module and the chromatic aberration compensation module to adaptively blend the radially corrected image and the chromatically corrected image into a composite corrected image to reduce distortions within the received image, and to output the composite corrected image to be viewed via a display having a lens.

Example 8 may include the apparatus of example 7, wherein the composite corrected image includes reduced distortions.

Example 9 may include the apparatus of any one of examples 7 or 8, wherein each of the plurality of distortion meshes are distorted in a barrel shape.

Example 10 may include the apparatus of example 9, wherein each of the plurality of distortion meshes include a triangulation grid.

Example 11 may include the apparatus of example 7, wherein each of the plurality of distortion meshes corresponds to a red color channel, a green color channel, or a blue color channel.

Example 12 may include the apparatus of example 11, wherein each of the color channels includes lens specific parameters to compensate for chromatic aberrations.

Example 13 may include a method for reducing distortions in an image viewed via a lens. The method may include mapping a received image onto one or more of a plurality of distortion meshes. The method may also include compensating for radial distortions within the received image and outputting a radially corrected image, and compensating for chromatic distortions within the received image and outputting a chromatically corrected image. The method may further include adaptively blending the radially corrected image and the chromatically corrected image into a composite corrected image to reduce distortions within the received image, and outputting the composite corrected image to be viewed via a display having a lens.

Example 14 may include the method of example 13, wherein the composite corrected image includes reduced distortions.

Example 15 may include the method of any one of examples 13 or 14, wherein each of the plurality of distortion meshes are distorted in a barrel shape.

Example 16 may include the method of example 15, wherein each of the plurality of distortion meshes include a triangulation grid.

Example 17 may include the method of example 16, wherein each of the plurality of distortion meshes corresponds to a red color channel, a green color channel, or a blue color channel.

Example 18 may include the method of example 17, wherein each of the color channels includes lens specific parameters to compensate for chromatic aberrations.

Example 19 may include a non-transitory computer-readable storage medium for reducing distortions within an image. The medium include a set of instructions that, if executed by a processor, may cause a computer to map a received image onto one or more of a plurality of distortion meshes. The medium also includes instructions that may cause the computer to compensate for radial distortions within the received image and output a radially corrected image; compensate for chromatic distortions within the received image and output a chromatically corrected image; adaptively blend the radially corrected image and the chromatically corrected image into a composite corrected image to reduce distortions within the received image; and output the composite corrected image to be viewed via a display having a lens.

Example 20 may include the system of example 19, wherein the composite corrected image includes reduced distortions.

Example 21 may include the system of any one of examples 19 or 20, wherein each of the plurality of distortion meshes are distorted in a barrel shape.

Example 22 may include the system of example 21, wherein each of the plurality of distortion meshes include a triangulation grid.

Example 23 may include the system of example 19, wherein each of the plurality of distortion meshes corresponds to a red color channel, a green color channel, or a blue color channel.

Example 24 may include the system of example 23, wherein each of the color channels includes lens specific parameters to compensate for chromatic aberrations.

Example 25 may include a system a distortion reducing apparatus for reducing distortions in an image viewed via a lens. The apparatus may include means for mapping received image onto a plurality of distortion meshes; means for compensating radial distortions within the received image and outputting a radially corrected image; means for compensating chromatic distortions within the received image and outputting a chromatically corrected image; and means for adaptively blending the compensated radial distortions and compensated chromatic distortions and outputting a corrected image. The means for adaptively blending may blend the radially corrected image and the chromatically corrected image into a composite corrected image to reduce distortions within the received image, and output the composite corrected image to be viewed via a display having a lens.

Example 26 may include the system of example 25, wherein the composite corrected image includes reduced distortions.

Example 27 may include the system of any one of examples 25 or 26, wherein each of the plurality of distortion meshes are distorted in a barrel shape.

Example 28 may include the system of example 27, wherein each of the plurality of distortion meshes include a triangulation grid.

Example 29 may include the system of example 25, wherein each of the plurality of distortion meshes corresponds to a red color channel, a green color channel, or a blue color channel.

Example 30 may include the system of example 29, wherein each of the color channels includes lens specific parameters to compensate for chromatic aberrations.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a non-transitory machine-readable storage medium which represents various logic within the processor, which when read by a machine causes the machine to fabricate logic to perform the techniques described herein. Such representations, known as "IP cores" may be stored on a tangible, non-transitory, machine readable storage medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well-known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

Some embodiments may be implemented, for example, using a machine or tangible computer-readable storage medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable storage medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments of this have been described in connection with particular examples thereof, the true scope of the embodiments should not be so limited since other modifications will become apparent to the skilled practitioner upon a study of the drawings, specification, and following claims.

I claim:

1. A system comprising:
a display having a lens arranged to view an image, wherein the display is head mounted or wearable and the lens is arranged between a viewer and the display;
an image mapping module, implemented at least partly in one or more of configurable logic or fixed functionality logic hardware, in communication with an image input source, to map a received image onto a plurality of distortion meshes;
a radial aberration compensation module, implemented at least partly in one or more of configurable logic or fixed functionality logic hardware, in communication with the image mapping module, to compensate for radial distortions caused by the lens and output a radially compensated image;
a chromatic aberration compensation module, implemented at least partly in one or more of configurable logic or fixed functionality logic hardware, in communication with the image mapping module, to compensate for chromatic distortions caused by different focal points of the lens for different wavelengths of color and output a chromatically compensated image, wherein the chromatic aberration compensation module is to independently compensate for chromatic aberrations for each of multiple different color channels of the received image; and
a blending module, implemented at least partly in one or more of configurable logic or fixed functionality logic hardware, in communication with the radial aberration compensation module and the chromatic aberration compensation module, to adaptively blend the radially compensated image and the chromatically compensated image into a composite image to reduce distortions caused by the lens, and output the composite image to the display, the composite image to be viewed on the display through the lens arranged between the viewer and the display.

2. The system of claim 1, wherein each of the plurality of distortion meshes are distorted in a barrel shape.

3. The system of claim 2, wherein each of the plurality of distortion meshes include a triangulation grid.

4. The system of claim 1, wherein each of the plurality of distortion meshes corresponds to a red color channel, a green color channel, or a blue color channel, the image mapping module is to map a distortion mesh of a green color channel to a base distance from a lens distortion center, and the image mapping module is to map the distortion meshes of the red color channel and the blue color channel based on the distance for the green color channel.

5. The system of claim 4, wherein each color channel of the plurality of distortion meshes includes lens specific parameters to compensate for chromatic aberrations for a single viewer.

6. An apparatus comprising:
an image mapping module, implemented at least partly in one or more of configurable logic or fixed functionality logic hardware, to map a received image onto a plurality of distortion meshes;
a radial aberration compensation module, implemented at least partly in one or more of configurable logic or fixed functionality logic hardware, to compensate, via at least one of the plurality of distortion meshes, for radial distortions caused by a lens and output a radially compensated image;
a chromatic aberration compensation module, implemented at least partly in one or more of configurable logic or fixed functionality logic hardware, to compensate, via multiple distortion meshes of the plurality of distortion meshes, for chromatic distortions caused by different focal points of the lens for different wavelengths of color and output a chromatically compensated image, wherein the chromatic aberration compensation module is to independently compensate for chromatic aberrations for each of multiple different color channels of the received image; and
a blending module, implemented at least partly in one or more of configurable logic or fixed functionality logic hardware, to adaptively blend the radially compensated image and the chromatically compensated image into a composite image to reduce distortions within the composite image caused by the lens, and output the composite image to a display, the composite image to be viewed on the display through the lens, wherein the display is a head mounted or wearable display having the lens and the lens is arranged between a viewer and the display.

7. The apparatus of claim 6, wherein each of the plurality of distortion meshes are distorted in a barrel shape.

8. The apparatus of claim 7, wherein each of the plurality of distortion meshes include a triangulation grid.

9. The apparatus of claim 6, wherein each of the plurality of distortion meshes corresponds to a red color channel, a green color channel, or a blue color channel, the image mapping module is to map a distortion mesh of a green color channel to a base distance from a lens distortion center, and the image mapping module is to map the distortion meshes of the red color channel and the blue color channel based on the distance for the green color channel.

10. The apparatus of claim 9, wherein each color channel of the plurality of distortion meshes includes lens specific parameters to compensate for chromatic aberrations for a single viewer.

11. A method comprising:
mapping a received image onto a plurality of distortion meshes;
compensating, using at least one of the plurality of distortion meshes, for radial distortions caused by a lens and outputting a radially compensated image;
compensating, using multiple distortion meshes of the plurality of distortion meshes, for chromatic distortions caused by different focal points of a lens for different wavelengths of color and outputting a chromatically compensated image, wherein the chromatic distortions are independently compensated for each of multiple different color channels of the received image;
adaptively blending the radially compensated image and the chromatically compensated image into a composite image to reduce distortions caused by the lens within the composite image when viewing the composite image on a display through the lens; and
outputting the composite image to be viewed on the display through the lens, wherein the display is a head mounted or wearable display having the lens, the lens arranged between a viewer and the display.

12. The method of claim 11, wherein the composite image comprises reduced distortions.

13. The method of claim 11, wherein each of the plurality of distortion meshes are distorted in a barrel shape.

14. The method of claim 13, wherein each of the plurality of distortion meshes include a triangulation grid.

15. The method of claim 14, wherein each of the plurality of distortion meshes corresponds to a red color channel, a green color channel, or a blue color channel and mapping the received image onto a plurality of distortion meshes includes mapping a distortion mesh of a green color channel to a base distance from a lens distortion center and mapping the distortion meshes of the red color channel and the blue color channel based on the distance for the green color channel.

16. The method of claim 15, wherein each color channel of the plurality of distortion meshes includes lens specific parameters to compensate for chromatic aberrations for a single viewer.

17. A non-transitory computer-readable storage medium comprising a set of instructions which, if executed by a processor, cause a computer to:
map a received image onto a plurality of distortion meshes;
compensate for radial distortions caused by a lens and output a radially compensated image;
compensate for chromatic distortions caused by different focal points of a lens for different wavelengths of color and output a chromatically compensated image, wherein the chromatic distortions are independently compensated for each of multiple different color channels of the received image;
adaptively blend the radially compensated image and the chromatically compensated image into a composite image to reduce distortions within the composite image when the composite image is viewed on a display through a lens; and
output the composite image to be viewed on a display through the lens, wherein the display is head mounted or wearable display having the lens, the lens arranged between a viewer and the display.

18. The medium of claim 17, wherein the composite image comprises reduced distortions.

19. The medium of claim 17, wherein each of the plurality of distortion meshes are distorted in a barrel shape.

20. The medium of claim 19, wherein each of the plurality of distortion meshes include a triangulation grid.

21. The medium of claim 17, wherein each of the plurality of distortion meshes corresponds to a red color channel, a green color channel, or a blue color channel and mapping the received image onto a plurality of distortion meshes includes mapping a distortion mesh of a green color channel to a base distance from a lens distortion center and mapping the distortion meshes of the red color channel and the blue color channel based on the distance for the green color channel.

22. The medium of claim 21, wherein each color channel of the plurality of distortion meshes includes lens specific parameters to compensate for chromatic aberrations for a single viewer.

* * * * *